United States Patent
Sheng et al.

(10) Patent No.: US 11,231,954 B2
(45) Date of Patent: Jan. 25, 2022

(54) METHOD FOR GENERATING NESTED CONTAINER WITH NO INTERSECTION AND FULL COVERAGE IN THE SAME LAYER AND READABLE STORAGE MEDIUM

(71) Applicants: INSTITUTE OF ACOUSTICS, CHINESE ACADEMY OF SCIENCES, Beijing (CN); BEIJING HILI TECHNOLOGY CO., LTD, Beijing (CN)

(72) Inventors: Yiqiang Sheng, Beijing (CN); Jinlin Wang, Beijing (CN); Yi Liao, Beijing (CN); Xiaozhou Ye, Beijing (CN); Gang Cheng, Beijing (CN); Haojiang Deng, Beijing (CN); Lingfang Wang, Beijing (CN)

(73) Assignees: INSTITUTE OF ACOUSTICS, CHINESE ACADEMY OF SCIENCES, Beijing (CN); BEIJING HILI TECHNOLOGY CO., LTD., Beijing (CN)

( * ) Notice: Subject to any disclaimer, the term of this patent is extended or adjusted under 35 U.S.C. 154(b) by 226 days.

(21) Appl. No.: 16/632,629

(22) PCT Filed: Dec. 21, 2017

(86) PCT No.: PCT/CN2017/117699
§ 371 (c)(1),
(2) Date: Jan. 21, 2020

(87) PCT Pub. No.: WO2019/052076
PCT Pub. Date: Mar. 21, 2019

(65) Prior Publication Data
US 2020/0167182 A1 May 28, 2020

(30) Foreign Application Priority Data

Sep. 18, 2017 (CN) .......................... 201710841726.1

(51) Int. Cl.
*G06F 15/16* (2006.01)
*G06F 9/455* (2018.01)
*H04L 12/24* (2006.01)

(52) U.S. Cl.
CPC ........ *G06F 9/45558* (2013.01); *H04L 41/044* (2013.01); *H04L 41/0806* (2013.01);
(Continued)

(58) Field of Classification Search
CPC ....... G06F 9/45558; G06F 2009/45562; G06F 2009/45595; G06F 2009/45566;
(Continued)

(56) References Cited

U.S. PATENT DOCUMENTS

| 2002/0087275 | A1* | 7/2002 | Kim | G16B 20/20 702/19 |
| 2011/0029675 | A1 | 2/2011 | Yeow et al. | |

(Continued)

FOREIGN PATENT DOCUMENTS

| CN | 101931543 A | 12/2010 |
| CN | 102364899 A | 2/2012 |
| CN | 103888982 A | 6/2014 |

OTHER PUBLICATIONS

Jun. 15, 2018 Search Report issued in International Patent Application No. PCT/CN2017/117699.

*Primary Examiner* — John B Walsh
(74) *Attorney, Agent, or Firm* — Oliff PLC

(57) ABSTRACT

A method for generating a nested container with no intersection and same layer full coverage, including: giving a right undirected graph G(V, E, W) and network measurement index set {Ti} for dividing nodes in G, each network (Continued)

measurement index Ti corresponding to a Ci layer container set {Ci k}; deleting an edge weighing greater than Ti, and segmenting G into subgraphs, each a connected component; setting all nodes in the subgraph Gcm not in the Ci layer container as set L; selecting one node from set L as current anchor aj; starting with anchor aj, performing breadth-first search on all nodes in L and Ci+1 layer container containing aj with the path communicated therewith less than Ti forming a Ci layer container with anchor aj; setting j'=j+1, determining whether L is a null set; setting m=m+1, determining whether all subgraphs are processed; setting i=i−1, and determining whether i=1 is satisfied.

10 Claims, 1 Drawing Sheet

(52) U.S. Cl.
CPC ............ *H04L 41/5054* (2013.01); *G06F 2009/45562* (2013.01); *G06F 2009/45595* (2013.01)

(58) Field of Classification Search
CPC .......... H04L 41/044; H04L 41/0806; H04L 41/5054; H04L 41/12; H04L 41/00; H04L 41/04
See application file for complete search history.

(56) References Cited

U.S. PATENT DOCUMENTS

2017/0366416 A1* 12/2017 Beecham ............... H04L 45/50
2018/0307950 A1* 10/2018 Nealis .................... G06F 5/015

* cited by examiner

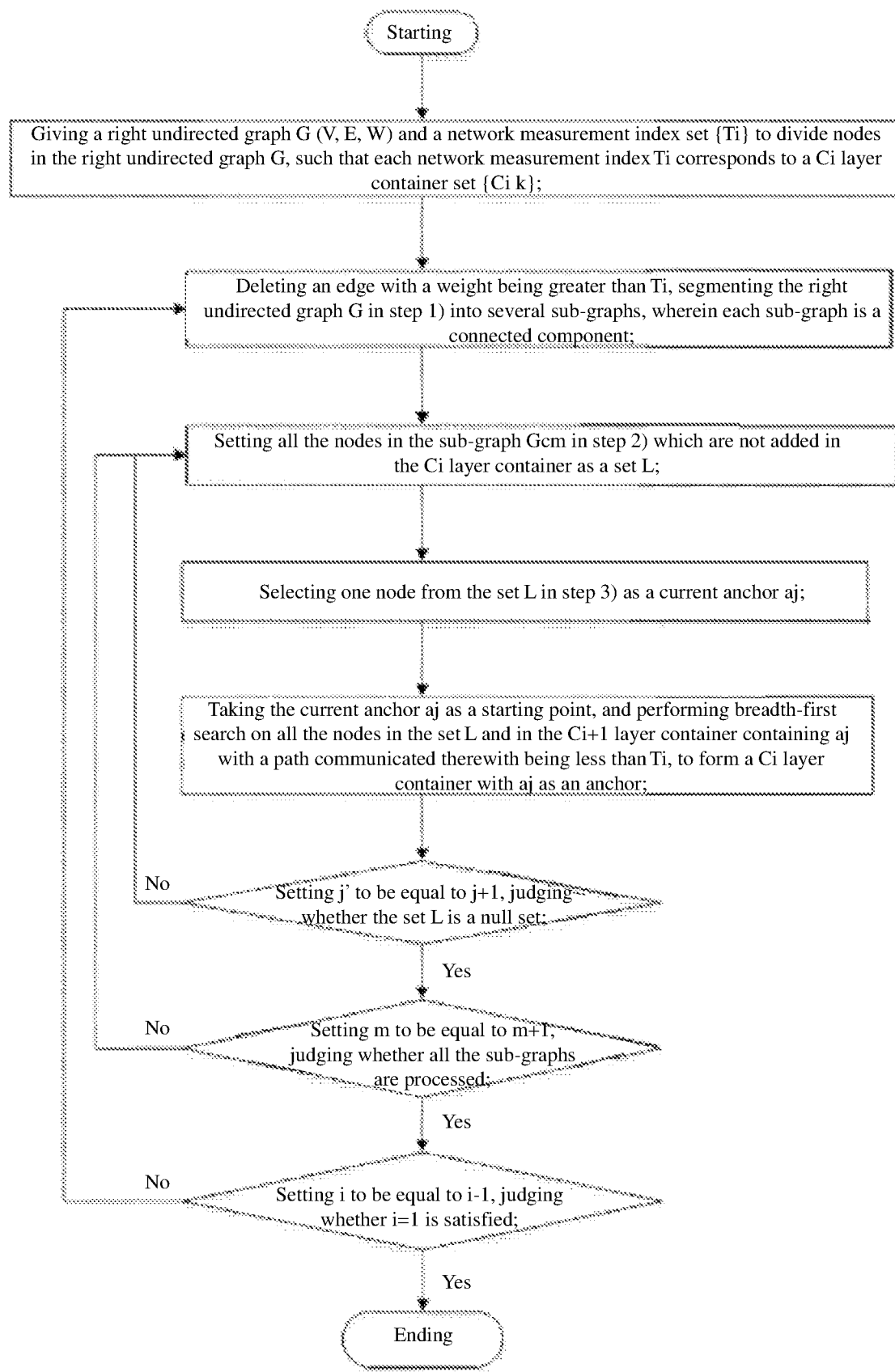

METHOD FOR GENERATING NESTED CONTAINER WITH NO INTERSECTION AND FULL COVERAGE IN THE SAME LAYER AND READABLE STORAGE MEDIUM

The present application claims the priority of the Chinese patent application No. 201710841726.1 filed on Sep. 18, 2017 and entitled "Method for Generating Nested Container with No Intersection and Full Coverage in Same Layer and Readable Storage Medium", the contents of which are incorporated by reference herein in its entirety.

TECHNICAL FIELD

The present invention belongs to the field of network technology and network communication technology, and in particular relates to a method for generating nested container with no intersection and full coverage in the same layer and readable storage medium.

BACKGROUND ART

In recent years, with rapid development of mobile internet, mobile devices increase explosively, thereby not only expanding network scale, but also dramatically increasing dynamics of the network. Since connection relationships between internet network devices are complex, a virtualization technology needs to be adopted to build a virtual network on a physical network, and through establishing a logical relationship between nodes, problems caused by heterogeneity and dynamics of physical devices can be avoided. In fact, the structure and consistency of a virtual network are directly related to execution efficiency, addressing efficiency, scalability, and instantaneity of applications built on a virtual network, especially for some businesses which have higher requirements on accuracy of node position and which are sensitive to time delay and jitter, such as streaming media broadcast, problems caused by dynamics and mobility have become increasingly prominent.

According to structures and node maintenance manners, the existing virtual network is divided into an unstructured virtual network and a structured virtual network. Neighbor nodes of an unstructured virtual network are arbitrary, positions of information resources in a network are not related to topology of the network itself, while neighbor nodes of a structured virtual network are regular, and a topological structure is strictly controlled. Wherein owing to effective organization of nodes and controllability of a topological structure, a structured virtual network is generally superior to an unstructured virtual network in terms of network flow control and addressing efficiency performance, and has received continuous attention. However, the existing structured virtual network cannot satisfy development requirements of such new applications as mobile access, pervasive computing, distributed information processing, mass streaming media, and cannot solve such problems as heterogeneity, dynamics, mobility and inconsistency, therefore, how to construct a structured virtual network so as to adapt to large-scale and high-dynamic future network environment including an information center network is a problem that has been discussed and to be solved in the academia and industry.

A container (Container) technology is to simplify setting up of a management cluster by a user and seamlessly integrate virtualization, storage, network and security capabilities through providing high-performance and scalable application management services. With a typical Docker container as an example, it is an open source application engine which can enable a developer to package applications to a portable container, then distribute applications to any popular Linux machine, and can also realize virtualization. A Docker container completely adopts a sandbox mechanism without any interface therebetween, almost has no performance overhead, can easily operate in a machine and a data center, and is independent of any programming language. However, the existing method for generating a container cannot construct a large-scale structured virtual network composed of a large number of heterogeneous nodes through a nested form, therefore, it is difficult to adapt to large-scale and high-dynamic future network environment.

SUMMARY OF THE INVENTION

An object of the present invention is as follows: in order to solve the above problem existing in the method for generating the existing container, the present invention provides a method for generating a nested container with no intersection and full coverage in a same layer, which is a method for node partition and information and resource organization based on network measuring result, so as to solve network problems caused by heterogeneity, dynamics, mobility and geographical distributivity, satisfy such requirements of time delay sensitivity, complexity, scalability and flexibility in network node management, and adapt to development of a future network including an information center network.

To achieve the above object, the present invention provides a method for generating a nested container with no intersection and full coverage in a same layer, specifically comprising:

step 1) giving a right undirected graph G (V, E, W) and a network measurement index set $\{T_i\}$ to divide nodes in the right undirected graph G, such that each network measurement index $T_i$ corresponds to a $C_i$ layer container set $\{C_i\ k\}$;

wherein, the network measurement index $T_i$ is specifically time delay or hop or bandwidth, $T_i < T_{i+1}$, $1 \le i \le I-1$, I is a constant, $0 \le k \le K-1$, and K is the number of $C_i$ layer containers, and the number of layers i is initialized to I-1;

step 2) deleting an edge with a weight being greater than $T_i$, segmenting the right undirected graph G in step 1) into several sub-graphs, wherein each sub-graph is a connected component; and sorting the several sub-graphs in an order of number of nodes from smallest to largest, wherein each sub-graph is donated as $G_{cm}=(V_{cm}, E_{cm}, W_{cm})$; wherein $1 \le m \le M$, M is the number of sub-graphs, m is a serial number of a sub-graph, and m, that is, the number of sub-graphs, is initialized to 1; if p isolated nodes exist in the several sub-graphs, then each isolated node is directly set as an anchor, and becomes an independent $C_i$ layer container, and it is assumed that j'=j+p, and m=m+p; and the number of anchors j is initialized to 1;

step 3) setting all the nodes in the sub-graph $G_{cm}$ in step 2) which are not added in the $C_i$ layer container as a set L;

step 4) selecting one node from the set L in step 3) as a current anchor $a_j$;

step 5) taking the current anchor $a_j$ as a starting point, and performing breadth-first search on all the nodes in the set L and in the $C_{i+1}$ layer container containing $a_j$ with a path communicated therewith being less than $T_i$, to form a $C_i$ layer container with $a_j$ as an anchor;

step 6) setting j'=j+1, judging whether the set L is a null set; if the set L is a null set, then going to the next step, and if the set L is not a null set, then returning to step 3), until the set L is a null set;

step 7) setting m=m+1, judging whether all the sub-graphs are processed, if all the sub-graphs are processed, then going to the next step, if all the sub-graphs are not processed, then returning to step 3), until all the sub-graphs are processed; and step 8) setting i=i−1, judging whether i=1 is satisfied; if i=1 is satisfied, then the process is finished and all the Ci containers are constructed; if i=1 is not satisfied, then returning to step 2), until all the Ci containers are constructed.

The Ci container is constructed and nested from top to bottom, and the number of layers of the Ci container gradually decreases.

Preferably, in step 4), a node with the best performance indexes such as bandwidth, calculation and storage in the set L is selected as a current anchor;

in the above technical solution, as to the right undirected graph G (V, E, W) in step 1), V is a set of nodes which contains any network element with an independent address, E is a set of edges between nodes in a measuring record, and W is a set of weights between nodes in a measuring record.

In the above technical solution, in step 1), when i=1, a C1 layer container is a bottom layer container, and is constituted by multiple network elements, and a C2 layer container is constituted by multiple C1 layer containers, and so on, and the Ith layer is a top layer container CI, and is constituted by multiple CI−1 layer containers.

The present invention further provides a computer readable storage medium with a computer program stored thereon, and the computer program is executed by a processor through the above method for generating a nested container with no intersection and full coverage.

The present invention has the following advantages: the method of the present invention has the advantages of delay sensitivity, easy management, favorable scalability, and good flexibility, and this is a method for node partition and information and resource organization based on network measuring result, so as to solve network problems caused by heterogeneity, dynamics, mobility and geographical distributivity, and adapt to development of a future network including an information center network, especially the next generation of mobile communication.

BRIEF DESCRIPTION OF DRAWINGS

FIG. 1 is a flow chart of a method for generating a nested container with no intersection and full coverage in a same layer of the present invention.

DETAILED DESCRIPTION OF THE EMBODIMENTS

As shown in FIG. 1, the present invention provides a method for generating a nested container with no intersection and full coverage in a same layer, specifically comprising:

step 1) giving a right undirected graph G (V, E, W) and a network measurement index set $\{Ti\}$ to divide nodes in the right undirected graph G, such that each network measurement index Ti corresponds to a Ci layer container set $\{Ci\ k\}$; wherein, the network measurement index Ti is specifically time delay or hop or bandwidth, $Ti<Ti+1$, $1 \le i \le I-1$, I is a constant, $0 \le k \le K-1$, and K is the number of Ci layer containers, and the number of layers i is initialized to I−1;

step 2) deleting an edge with a weight being greater than Ti, segmenting the right undirected graph G in step 1) into several sub-graphs, wherein each sub-graph is a connected component; and sorting the several sub-graphs in an order of number of nodes from smallest to largest, wherein each sub-graph is donated as Gcm=(Vcm, Ecm, Wcm); wherein $1 \le m \le M$, M is the number of sub-graphs, m is a serial number of a sub-graph, and m, that is, the number of sub-graphs, is initialized to 1; c herein is not a parameter, c means child, is only a label, represents a sub-graph, and mainly functions to distinguish G from Gc. If p isolated nodes exist in the several sub-graphs, then each isolated node is directly set as an anchor, and becomes an independent Ci layer container, and it is assumed that j'=j+p, and m=m+p; and the number of anchors j is initialized to 1;

step 3) setting all the nodes in the sub-graph Gcm in step 2) which are not added in the Ci layer container as a set L;

step 4) selecting one node from the set L in step 3) as a current anchor aj;

step 5) taking the current anchor aj as a starting point, and performing breadth-first search on all the nodes in the set L and in the Ci+1 layer container containing aj with a path communicated therewith being less than Ti, to form a Ci layer container with aj as an anchor;

step 6) setting j'=j+1, judging whether the set L is a null set; if the set L is a null set, then going to the next step, and if the set L is not a null set, then returning to step 3), until the set L is a null set;

step 7) setting m=m+1, judging whether all the sub-graphs are processed, if all the sub-graphs are processed, then going to the next step, if all the sub-graphs are not processed, then returning to step 3), until all the sub-graphs are processed; and step 8) setting i=i−1, judging whether i=1 is satisfied; if i=1 is satisfied, then the process is finished and all the Ci containers are constructed; if i=1 is not satisfied, then returning to step 2), until all the Ci containers are constructed.

The Ci container is constructed and nested from top to bottom, and the number of layers of the Ci container gradually decreases.

Preferably, in step 4), a node with the best performance indexes such as bandwidth, calculation and storage in the set L is selected as a current anchor;

in the above technical solution, as to the right undirected graph G (V, E, W) in step 1), V is a set of nodes which contains any network element with an independent address, E is a set of edges between nodes in a measuring record, and W is a set of weights between nodes in a measuring record.

In the above technical solution, in step 1), when i=1, a C1 layer container is a bottom layer container, and is constituted by multiple network elements, and a C2 layer container is constituted by multiple C1 layer containers, and so on, and the Ith layer is a top layer container CI, and is constituted by multiple CI−1 layer containers.

The present invention further provides a computer readable storage medium with a computer program stored thereon, and the computer program is executed by a processor through the above method for generating a nested container with no intersection and full coverage in a same layer.

Finally, it should be noted that, the above embodiments are merely used for explaining technical solutions of the present invention, rather than for limiting the present invention. Although the present invention has been described in detail with reference to embodiments, those skilled in the art should understand that, any modifications or equivalent substitutions made to the technical solutions of the present invention all do not depart from spirit and scope of the technical solutions of the present invention, and should be encompassed in the scope of claims of the present invention.

The invention claimed is:

1. A method for generating nested container with no intersection and full coverage in the same layer, specifically comprising:

step 1) giving a right undirected graph G (V, E, W) and a network measurement index set {Ti} to divide nodes in the right undirected graph G, such that each network measurement index Ti corresponds to a Ci layer container set {Ci k};

thereof, the network measurement index Ti is specifically time delay or hop or bandwidth, Ti<Ti+1, 1≤i≤I−1, I is a constant, 0≤k≤K−1, and K is the number of Ci layer containers, and the number of layers i is initialized to I−1;

step 2) deleting an edge with the weight being greater than Ti, segmenting the right undirected graph G in step 1) into several sub-graphs, thereof each sub-graph is a connected component; and sorting the several sub-graphs in an order of number of nodes from smallest to largest, thereof each sub-graph is donated as Gcm= (Vcm, Ecm, Wcm); thereof 1≤m≤M, M is the number of sub-graphs, m is a serial number of a sub-graph, and m, that is, the number of sub-graphs, is initialized to 1; if p isolated nodes exist in the several sub-graphs, then each isolated node is directly set as an anchor, and becomes an independent Ci layer container, and it is assumed that j'=j+p, and m=m+p; and the number of anchors j is initialized to 1;

step 3) setting all the nodes in the sub-graph Gcm in step 2) which are not added in the Ci layer container as a set L;

step 4) selecting one node from the set L in step 3) as a current anchor aj;

step 5) taking the current anchor aj as a starting point, and performing breadth-first search on all the nodes in the set L and in the Ci+1 layer container containing aj with a path communicated therewith being less than Ti, to form a Ci layer container with aj as an anchor;

step 6) setting j'=j+1, judging whether the set L is a null set; if the set L is a null set, then going to the next step, and if the set L is not a null set, then returning to step 3), until the set L is a null set;

step 7) setting m=m+1, judging whether all the sub-graphs are processed, if all the sub-graphs are processed, then going to the next step, if all the sub-graphs are not processed, then returning to step 3), until all the sub-graphs are processed; and step 8) setting i=i−1, judging whether i=1 is satisfied; if i=1 is satisfied, then the process is finished and all the Ci containers are constructed; if i=1 is not satisfied, then returning to step 2), until all the Ci containers are constructed.

2. The method for generating a nested container with no intersection and full coverage in a same layer of claim 1, wherein the Ci container is constructed and nested from top to bottom, and the number of layers of the Ci container gradually decreases.

3. The method for generating a nested container with no intersection and full coverage in a same layer of claim 1, wherein in step 4), selecting a node with the best performance indexes such as bandwidth, calculation and storage in the set L as a current anchor.

4. The method for generating a nested container with no intersection and full coverage in a same layer of claim 1, wherein as to the right undirected graph G (V, E, W) in step 1), V is a set of nodes which contains any network element with an independent address, E is a set of edges between nodes in a measuring record, and W is a set of weights between nodes in a measuring record.

5. The method for generating a nested container with no intersection and full coverage in a same layer of claim 1, wherein in step 1), when i=1, a C1 layer container is a bottom layer container, and is constituted by multiple network elements, and a C2 layer container is constituted by multiple C1 layer containers, and so on, and the Ith layer is a top layer container CI, and is constituted by multiple CI−1 layer containers.

6. A computer readable storage medium with a computer program stored thereon, wherein the computer program is executed by a processor through the method for generating a nested container with no intersection and full coverage in a same layer in claim 1.

7. The computer readable storage medium with a computer program stored thereon, wherein the computer program is executed by a processor through the method for generating a nested container with no intersection and full coverage in a same layer in claim 2.

8. The computer readable storage medium with a computer program stored thereon, wherein the computer program is executed by a processor through the method for generating a nested container with no intersection and full coverage in a same layer in claim 3.

9. The computer readable storage medium with a computer program stored thereon, wherein the computer program is executed by a processor through the method for generating a nested container with no intersection and full coverage in a same layer in claim 4.

10. The computer readable storage medium with a computer program stored thereon, wherein the computer program is executed by a processor through the method for generating a nested container with no intersection and full coverage in a same layer in claim 5.

* * * * *